Nov. 4, 1958

D. G. ZIMMERMAN 2,859,011

TURBINE BUCKET AND LINER

Filed July 27, 1953

INVENTOR.
Donald G. Zimmerman
BY
Paul Fitzpatrick
ATTORNEY

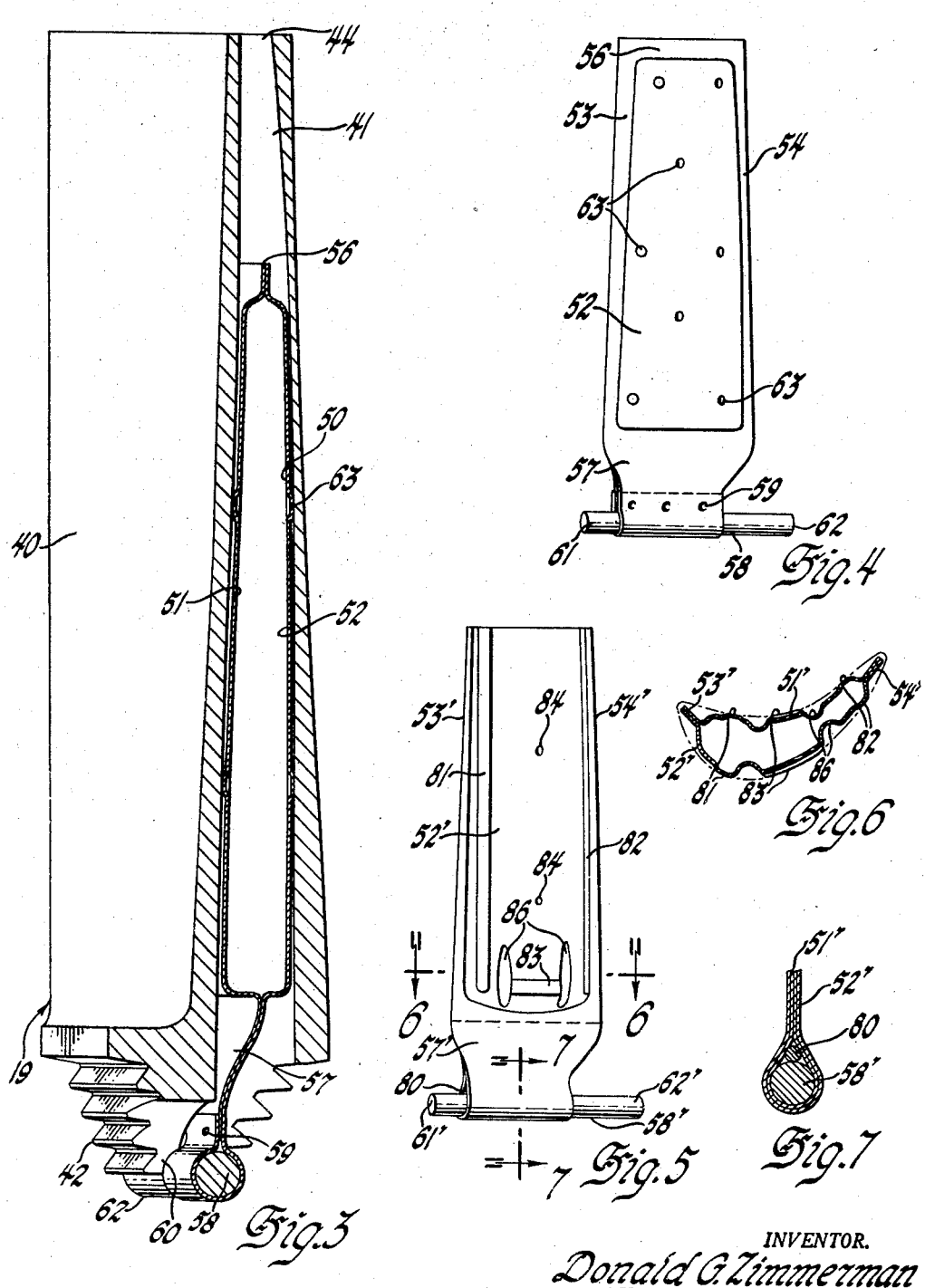

United States Patent Office 2,859,011
Patented Nov. 4, 1958

2,859,011

TURBINE BUCKET AND LINER

Donald G. Zimmerman, Indianapolis, Ind., assignor to General Motors Corporation, Detroit, Mich., a corporation of Delaware Application July 27, 1953, Serial No. 370,305

4 Claims. (Cl. 253—39.15)

My invention relates to cooled gas turbine blading installations and particularly to a bucket provided with an internal liner to direct the cooling air more effectively.

It has been proposed previously to circulate a cooling fluid such as air through the blades of a gas turbine. In order to maintain a relatively thin wall in the blade, the internal passage through which the air is circulated from one end of the blade to the other may be of considerable area. By installing a fluid deflector, commonly called a blade liner, fluid may be caused to flow at higher velocity adjacent the inner wall of the blade so as to secure better heat transfer.

My invention is concerned with the structure of such a liner and its mounting in a gas turbine blade of known type which may be installed in an engine of known or conventional configuration.

A liner of somewhat similar character to those disclosed herein is shown and described in the application of Wilgus S. Broffitt, Serial No. 289,341, filed May 22, 1952, of common ownership with this application (now abandoned).

The principal objects of the present invention are to provide a liner arrangement which facilitates obtaining desired coolant distribution, which facilitates the mounting of the liner, and which provides for a strong and rugged liner construction. The nature of the invention and the advantages thereof will be more clearly apparent to those skilled in the art from the succeeding detailed description of preferred embodiments thereof and the accompanying drawings in which:

Fig. 3 is an axonometric view, with parts cut away, of a bucket and liner therefor;

Fig. 4 is an elevational view of the liner, including the anchoring pin, of Figs. 2 and 3;

Fig. 5 is an elevation view of a second form of liner with the anchoring pin;

Fig. 6 is a cross-section of the same taken on the plane indicated by the line 6—6 in Fig. 5, and Fig. 7 is a fragmentary sectional view of the same taken on the plane indicated by the line 7—7 in Fig. 5.

Figure 1:
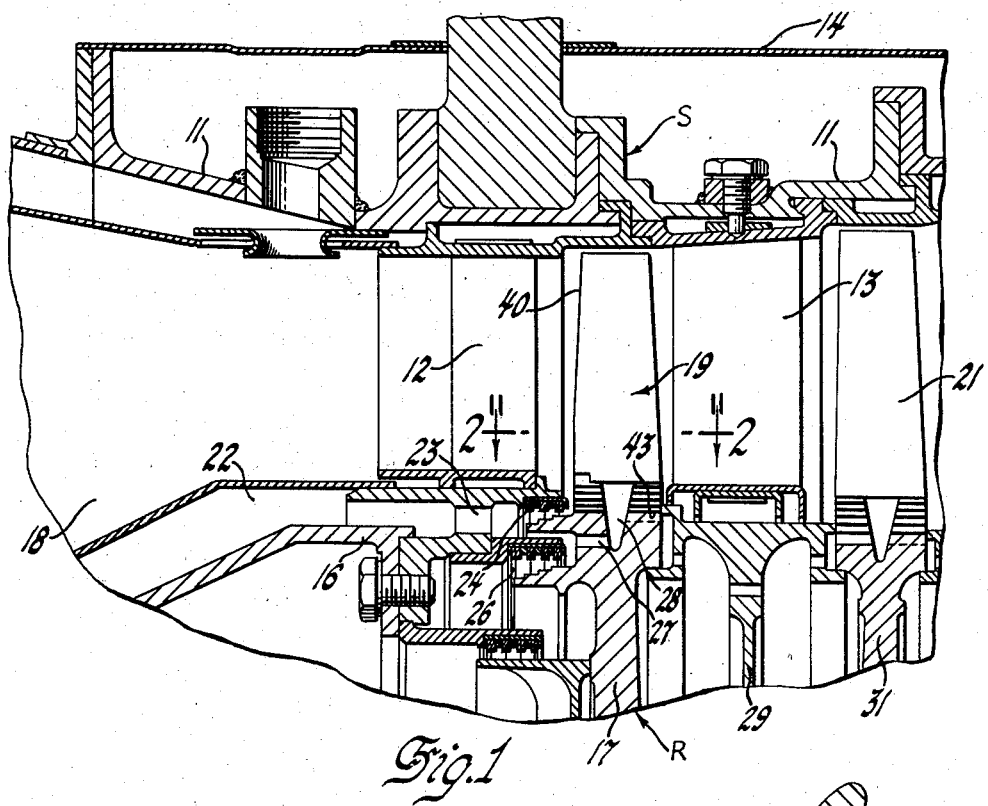
Fig. 1 is a fragmentary sectional view of a portion of a gas turbine, this section being taken on a plane containing the axis of the engine.

Fig. 1 illustrates the mounting of turbine buckets embodying the invention in a gas turbine engine. It will be understood, however, that the structure of the engine, apart from the fact that it meets the requirement of providing a circulation of cooling fluid to the base or root of the bucket, is immaterial to the present invention. The turbine comprises a stator S and a rotor R mounted therein on suitable bearings (not shown). The stator S may be of the character described in the copending application of Wheatley et al., Serial No. 285,170, filed April 30, 1952 (Patent 2,793,832), and the rotor, including the arrangement for bringing air to the roots of the buckets, may be of the character shown in my copending application Serial No. 283,611, filed April 22, 1952 (Patent 2,807,434), both said applications being of common ownership with this application. The stator comprises an outer casing 11 within which are mounted nozzle vanes 12 and intermediate stage vanes 13, the whole being enclosed in a heat shield 14. The stator also includes an annular structure 16 on which are mounted the stationary parts of labyrinth seals cooperating with the first stage wheel 17 of the rotor. The discharge portion 18 of each of a number of combustion chambers discharges motive fluid through the turbine nozzle vanes 12 which then flows through the first stage buckets 19, the vanes 13, the second stage buckets 21, and additional stages, if provided, to the turbine exhaust. Combustion chamber jacket air for bucket cooling flows through the space 22 between the motive fluid duct 18 and the fixed structure 16 through openings 23 in the stationary structure between labyrinth seals 24 and 26 into openings or passages 27 in the forward face of the turbine wheel 17 adjacent the rim of the wheel. The cooling air inlets 27 communicate with a circumferential groove 28 in the rim of the wheel 17 by which the air is supplied to the buckets 19. A spacer ring or disk 29 separates the first turbine wheel 17 from the second turbine wheel 31 on which the buckets 21 are mounted. Cooling air may also be supplied to the second stage wheel but it is unnecessary for our purposes to describe this, since the first and second stage wheels and buckets may be identical in structure.

Figure 2:
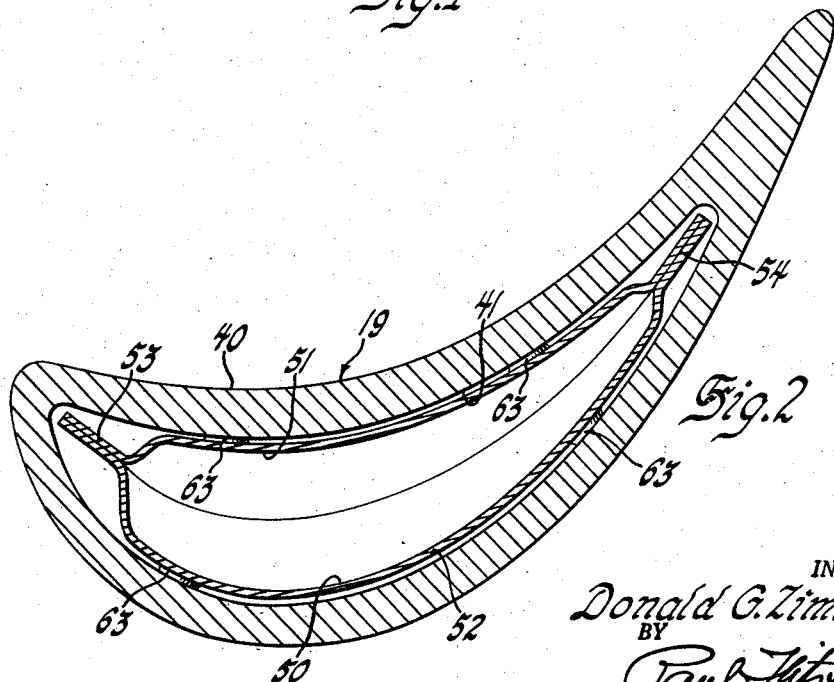
Fig. 2 is a cross-section of a rotor bucket taken on the plane indicated by the line 2—2 in Fig. 1.

As is most clearly shown in Fig. 2, the blade portion 40 of the bucket is of generally airfoil shape and is hollow, the internal opening 41 being of such form as to leave a substantially uniform wall. This wall is preferably as thin as is consistent with the required strength and may be tapered toward the tip of the blade. The blade root portion 42 (Figs. 1 and 3) is preferably of the multiple dovetail or "fir tree" type for insertion into a mating groove 43 extending across the rim of the wheel. The groove 43 intersects the circumferential groove 28 and the passage 41 through the blade comprises a continuation extending into the blade root so that the air may flow from the groove 28 in the wheel through the passage 41 spanwise of the blade and out at the free end 44 of the blade.

To concentrate the flow of cooling air along the wall of the blade, particularly in the hottest and most highly stressed portions thereof, the hollow blade liner 50 is fitted within the internal passage 41, which decreases in width toward the tip of the blade. The liner 50 may comprise two die-formed metal sheets 51 and 52 spot-welded or seam-welded at the flanged edges 53 and 54 which correspond to the leading and trailing edges of the blade. The two sheets are also in contact and welded together at the outer end 56 of the liner. The two sheets 51 and 52 abut at the root end of the liner and are spot-welded or brazed together to form an attaching portion or shank 57 extending through the bucket root. The sheet 52 extends beyond the sheet 51 and is wrapped around a pin 58 and spot-welded as at 59 to the other face of the sheet 51. The pin 58 may be high temperature brazed in place, if desired. As will be most clearly apparent from Fig. 4, the pin 58 extends outwardly toward the leading and trailing edges from the shank 57, the projecting portions 61 and 62 of the pin serving to anchor the liner. These portions engage in half-round notches 60 extending across the end of the blade root and are located between the end of the blade root and the bottom of the slot 43 in the turbine wheel.

As will be particularly apparent from Fig. 2, the liner, apart from the flanged portions 53 and 54 within the leading and trailing edges of the blade, is disposed closely adjacent the blade surface to provide a narrow passage so that there is no waste of air flowing through the blade and a good scouring action of the air on the walls of the blade is obtained. In order to maintain the desired spacing of the liner and prevent rattling or tinning, a suitable number of spaced projections 63 are formed on the faces of the liner to engage the wall of the blade.

It will be understood that the shank 57 is straight or flat where it is wrapped around the straight pin 58 but is warped in accordance with the curvature of the blade where it joins the hollow part of the blade liner.

Figs. 5 to 7, inclusive, illustrate a second form of liner which is installed in the blade in the same way and for the same purpose as the liner shown in Figs. 2 to 4, inclusive. Corresponding parts in the liner of Figs. 5 to 7 will be given numbers corresponding to those of the liner previously described with the addition of primes. Thus, this liner comprises two metal sheets 51' and 52', bonded together by spot-welding or otherwise along the leading and trailing edges 53' and 54' and abutting to form a shank 57'. The two sheets at the end of the shank portion are looped back upon themselves as illustrated in Fig. 7 around an anchoring pin 58' and a second pin 80 which occupies the somewhat triangular space between the upper surface of the pin 58' and the portion of the shank which is doubled around it. The metal sheets 51' and 52' and the pins 58' and 80 may be welded or brazed to form a unitary assembly, the pin 80 strengthening the liner at the attachment between the shank and the retaining pin 58'. It may be noted that the outline of the opening in the blade within which the liner is inserted is indicated in Fig. 6 in broken lines. The liner is spaced from the walls of the blade by spanwise extending ridges or ribs 81 and 82 on each face thereof, by short transverse ribs 83 near the base of the blade, and by prominences 84 extending from the intermediate part of each face of the liner to engage the wall of the bucket. Grooves 86 indented in the face of the liner at each end of the rib 83 serve to conduct an adequate quantity of cooling air into the channel defined between the wall of the blade, the face of the liner, and the ribs 81 and 82.

It will be seen that the liner of Figs. 5 to 7 is distinguished from that of Figs. 2 to 4 by the separation of the air paths or channels along the leading and trailing edges of the blade from those along the faces by the ribs 81 and 82, which provides for more accurate control of the quantity of cooling air directed to these several areas. The size of the grooves 86 may readily be varied to vary the portion of air distributed to the cooling paths in accordance with the requirements of different operating conditions or installations. The provision of the pin 80 in the attaching portion of the liners of Figs. 5 to 7 also increases the strength at this point by eliminating the somewhat sharp fold around the pin 58 of Fig. 3.

As will be apparent, the liners of both forms are very easily installed. With the bucket out of the rotor, the liner is simply inserted into the passage 41 therein from the root end of the bucket and the pin 58 lodges in the groove 60 on the bottom of the root. The entire assembly may then be slid into the transverse slot in the rotor in the usual way and the buckets retained in any usual manner. The pin 58 is thus disposed between the bucket root and the bottom of the slot in the rotor so that the liner is properly located. The liner causes the cooling air to be properly distributed over the walls of the passage 41 and to flow over the wall with a satisfactory velocity.

The description herein of preferred embodiments of the invention for the purpose of explaining the principles and application thereof is not to be considered as limiting the invention, various embodiments of which may be devised by the exercise of skill in the art.

I claim:

1. In combination, a turbine bucket including a blade portion and a root portion, the bucket having a coolant passage extending spanwise therethrough, and a blade liner slidably mounted in the said coolant passage to direct the flow of coolant adjacent the walls of the said passage, the liner and passage being so dimensioned that the liner is slidably insertable and removable through the root portion of the bucket the said liner including a shank, a pin extending from the shank transversely of the span of the blade portion adapted to engage the end of the root portion, the end of the root portion being notched to provide an open seat for the said pin allowing removal of the liner, the shank being wrapped around the said pin, and a second pin lying against and smaller than the first pin mounted within the bight of the shank between the first mentioned pin and the liner.

2. In a gas turbine, in combination, a turbine bucket comprising a blade portion and a root portion and defining a passage extending spanwise through the blade portion, a liner mounted in the said passage and provided with ribs engaging the wall of the said passage and extending spanwise of the blade portion to define distinct air flow channels in the passage between the liner and the wall of the passage adjacent each edge of the blade portion and adjacent each face of the blade portion, and with ribs extending chordwise of the blade portion transversely of at least some of the channels operative to impede air flow through the said some channels and thus to apportion the air flow between the channels, and means for supplying air to the root end of the said passage for circulation through the blade portion.

3. In combination, a turbine rotor, a bucket including a blade portion and a root portion mounted on the rotor, the bucket having a coolant passage extending spanwise thereof, and a blade liner slidably mounted in the said coolant passage to direct the flow of coolant adjacent the walls of the said passage, the liner being provided with ribs engaging the wall of the said passage and extending spanwise of the blade portion to define distinct air flow paths in the passage adjacent each edge of the blade portion and adjacent each face of the blade portion, the liner and passage being so dimensioned that the liner is slidably insertable and removable through the root portion of the bucket, the said liner including a shank with a pin extending from the shank transversely of the span of the blade portion between the end of the root portion and the rotor, the end of the root portion being notched to provide an open seat for the said pin allowing removal of the liner.

4. In combination, a turbine bucket including a blade portion and a root portion, the bucket having a coolant passage extending spanwise therethrough, and a blade liner slidably mounted in the said coolant passage to direct the flow of coolant adjacent the walls of the said passage, the liner being provided with ribs engaging the wall of the said passage and extending spanwise of the blade portion to define distinct air flow paths in the passage adjacent each edge of the blade portion and adjacent each face of the blade portion, the liner and passage being so dimensioned that the liner is slidably insertable and removable through the root portion of the bucket, the said liner including a shank with a pin extending from the shank transversely of the span of the blade portion adapted to abut freely the end of the root portion, the end of the root portion being notched to provide an open seat for the said pin allowing removal of the liner.

References Cited in the file of this patent

UNITED STATES PATENTS

| 2,559,131 | Oestrich et al. | July 3, 1951 |
| 2,647,368 | Triebbnigg et al. | Aug. 4, 1953 |
| 2,650,803 | Rosskopf | Sept. 1, 1953 |
| 2,656,146 | Sollinger | Oct. 20, 1953 |

FOREIGN PATENTS

| 237,453 | Switzerland | Aug. 16, 1945 |
| 853,534 | Germany | Oct. 27, 1952 |